July 7, 1964

J. A. CULL ETAL 3,140,155

HYDROGEN HALIDE RECOVERY

Filed May 21, 1959

United States Patent Office 3,140,155
Patented July 7, 1964

3,140,155
HYDROGEN HALIDE RECOVERY
Jay A. Cull, Niagara Falls, and Thomas Hooker, Youngstown, N.Y., assignors to Hooker Chemical Corporation, Niagara Falls, N.Y., a corporation of New York
Filed May 21, 1959, Ser. No. 814,700
4 Claims. (Cl. 23—277)

This invention relates to a process and furnace apparatus capable of converting halogenated organic residue materials to recover hydrogen halide therefrom as a saleable product.

Halogenated residues from chlorination and bromination processes, such as residues from the chlorination processes manufacturing hexachlorocyclopentadiene, benzoyl chloride, benzyl chloride, chlorendic acid, etc., have in the past presented a difficult disposal problem. They are toxic to plant and animal matter, so that they should not be sewered into rivers or lakes, nor should they be dumped on land where the drainage therefrom would reach waters being used for drinking purposes. And because they have a large amount of halogenated material in them, normal furnace disposal means have been unsuitable because the materials either would not burn easily or gave free halogen in the exit gases which corroded the equipment and contaminated the air. Further, the halogen content of the residues was lost.

Therefore, it is an object of this invention to provide a process and furnace apparatus whereby hydrogen halide can be recovered in saleable form from halogenated organic residues.

Another object is to provide a process and furnace apparatus whereby halogenated organic residues can be converted into a hydrogen halide product having substantially no free carbon and free halogen and no organics.

Another object is to provide a self-regenerative furnace apparatus which can be operated continuously to burn halogenated organic residue materials, and not require being intermittently shut down to regenerate the needed heat of ignition.

Another object is to provide residue disposal apparatus which does not require auxiliary fuel during the disposal operation, thereby reducing the disposal cost.

Another object is to provide a furnace capable of burning perhalogenated organic residues which are normally considered to be noncombustible.

It has been found that these and other related objects can be accomplished in a novel heat-recuperative furnace comprising: an outer cylindrical firewall vertically positioned on a foundation at the bottom and covered at the top, and said outer firewall having feed inlet means therein; and an inner cylindrical firewall concentrically aligned with the said outer firewall to form an annular space between the two said firewalls, and said inner firewall positioned on the said foundation and in communication with outlet means at the bottom and in open communication with the top inner space of the said outer firewall.

Figure 2:
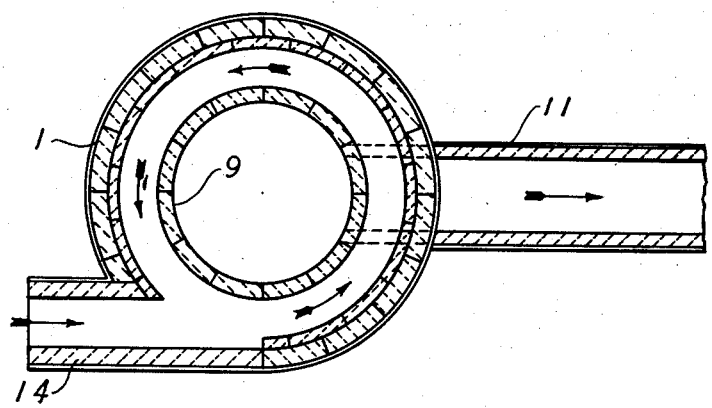
Figure 1:
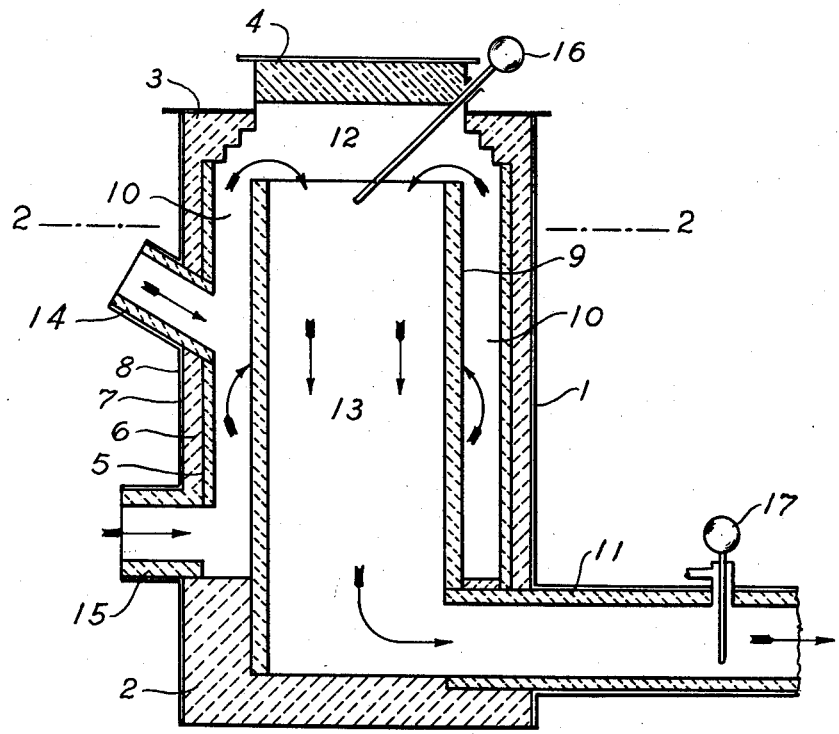

The accompanying figures have been given to show a preferred embodiment of our invention; however, we do not wish to be limited thereto except as defined in the appended claims. FIGURE 1 shows a vertical cross-sectional view of our preferred furnace and FIGURE 2 shows a top sectional view of the same furnace.

The furnace has an outer cylindrical firewall 1 vertically positioned on a foundation 2 at the bottom and covered at the top with refractory brick 3 and an insulated manhole cover 4 which also serves as an explosion relief means. The outer firewall 1 is constructed on the inside of refractory material 5 which has a low heat conductivity and which is resistant to free halogen, oxygen and hydrogen halide, such as mullite, a composition of aluminum silicate. This is backed up by firebrick 6. An air gap 7 separates the refractory materials from a gas-tight steel shell 8.

The furnace also has an inner cylindrical firewall 9 concentrically aligned with the outer firewall 1 so that an annular space 10 is formed between the inner and outer walls. The inner firewall 9 is also positioned on the foundation 2 and is in communication at the bottom with an insulated outlet means 11. The inner wall 9 is in open communication with the top inner space 12 of the outer firewall 1. The inner wall 9 should be constructed of heat conductive refractory material such as silicon carbide brick, so that there can be an exchange of heat from the inside 13 of the inner wall cylinder through the refractory material to the annular space 10 and thereby both preheat the incoming feed materials to their operation temperature and cool down the exiting reaction products. The height of the inner wall depends largely upon the amount of effective heat transfer across the inner wall.

The outer wall 1 has a residue feed inlet means 14. This inlet 14 is positioned in the outer wall preferably below the top of the inner wall 9 and as close to the bottom as possible without causing carbon build up in the relatively cool bottom zone or a decrease in the effective mixing of the gases in space 10. The angle of the inlet 14 is preferably downward and tangential to the cylindrical outer wall 1. The incoming residue materials injected in this direction aids in creating a greater amount of turbulence in the annular space 10, which in turn increases the overall heat transfer rate across the inner wall 9. The residue inlet 14 can also be used to introduce air or other materials such as steam or hydrogen.

The outer wall 1 also has a second inlet 15 positioned to have materials enter near the bottom of the annular space 10. This second inlet means 15 is preferably used to start up the furnace by injecting air and hydrogen or fuel gas therein, and afterward to control or regulate the composition of the final product by injecting steam or air or a hydrogen source, etc., as required, as more fully taught below. This inlet 15 can also be used to bring the furnace back up to the required operating temperature if it drops below that point. Residue materials have also been fed into the furnace through this inlet 15 and converted successfully, but in general, the operation of the furnace has not been as smooth. This inlet 15 is preferably positioned in the outer wall 1 to be tangential to the annular space in the same direction as inlet 14 which aids in creating a greater amount of turbulence in the annular space and thereby increases the efficiency of preheating the reactant materials and overall heat transfer across the inner wall 9. Although the inlet 15 is depicted in FIGURES 1 and 2 as being directly below the first inlet means 14, this need not be done.

It is to be understood that we do not wish to be limited to either inlet means for the introduction of residue materials and other combustion feeds. Successful conversions have been accomplished by feeding everything in inlet 14, or everything in inlet 15, or combinations of feeds in inlets 14 and 15.

As shown in FIGURE 1, the furnace preferably has a reaction temperature indicating means 16 positioned in the top inner space 12 of the outer wall 1. The furnace preferably also has an exit temperature indicating means 17 in the outlet 11. Suitable temperature indicating means are thermocouples or pyrometers.

In general, temperature variations within the furnace seemed to have little or no effect upon the overall reaction in the range of 900 to 1300 degrees centigrade. When burning perchlorinated materials, the furnace should be preheated to 900 degrees centigrade; however, lower operating temperatures have been found satisfactory when feeding more flammable materials. So far as we know, the upper temperature limit is dependent mainly on the materials of construction of the furnace and the temperature measuring devices, if employed.

Under normal conditions the temperature of the furnace at the top of the inner space 12 was about 300 centigrade degrees higher than the temperature of the exit gases. However, if feed rates are increased above the capacity of the furnace, more time will be required to bring the reactants up to the operating temperature. Therefore, the temperature of the inner space 12 will decrease, and the exit temperature will increase, causing the furnace to be in a state of thermal unbalance. Maximum furnace capacity of the furnace shown in FIGURES 1 and 2 was found to be when the exit gas temperature 17 was equal to the furnace temperature at space 12. However, this is also dependent on the size of the annular space 10, the heat transfer efficiency across the inner wall 9, the height of the inner wall 9 and other factors.

In operating in accordance with this invention, the residue is introduced into a furnace along with a hydrogen source to supply the hydrogen requirements and with an oxygen source to supply the oxygen requirements. Since the residue may already have some burnable hydrogen, the amount of hydrogen source depends on the material to be burned. The hydrogen source is selected from the group consisting of steam, hydrogen gas, hydrocarbon gas and mixtures thereof. If the residue contains sufficient burnable hydrogen, no additional hydrogen is needed. However, residues which have high convertible halogen contents and little or no convertible hydrogen, will require a hydrogen source. Steam is the preferred source and, when needed, the quantity necessary is only slightly higher than the theoretical amount required for the conversion of chlorine to hydrogen chloride. However, large excesses of steam over theory have been used without substantially influencing the temperatures or retention time of the reactants. Likewise, the minimum amount of oxygen source depends on the carbon content of residue burned. The oxygen source is selected from the group consisting of steam, air, oxygen and mixtures thereof. Where it is desirable to recover the hydrogen halide as a saleable product, it may be more economical to use oxygen rather than air in order to avoid the greater gas processing costs and equipment. The maximum amount of air which can be used is that amount which does not unduly cool the furnace.

The residue will burn when the furnace is maintained hotter than that temperature of operation needed to maintain combustion decomposition. When perchlorinated residues are decomposed into burnable byproducts, this temperature may need to be at least 900 degrees centigrade, but residues which have more hydrogen may burn initially at lower temperatures. The furnace can be preheated to the operating temperature by any convenient means, such as a hydrogen-air flame.

The residues which can be converted by this invention are both those fluids and semisolids which are combustible in ordinary waste disposal furnaces, as well as highly halogenated organic residues which are normally difficult or impossible to decompose completely in ordinary waste disposal incinerators. Such residues include halogenated organic materials entrained in hydrogen halide gas. Further, the process of this invention provides a gaseous product therefrom comprising hydrogen halide and carbon dioxide, and which has substantially no free chlorine, free carbon or organic compounds. This product many therefore be further processed to obtain a saleable hydrogen halide product, such as by passing it through a hydrogen halide absorption apparatus.

Many residues have been successfully converted in accordance with this process. Among the residues which may be converted are hexachlorocyclopentadiene, octachlorocyclopentene, $C_5HCl_7$, $C_6Cl_6$, trichlorobenzenes, tetrachlorobenzenes, trichlorophenols, pentachlorophenol, monochlorotoluene, monochlorobenzyl chloride, chlorobenzoyl chlorides, chlorinated aliphatic acids, sulfur-containing chlorinated organics, and others. In general, the residues are in liquid or slurry form, but they may be entrained in an inert gas, such as hydrogen chloride.

The outer firewall should be constructed of material which has a relatively low heat conductivity and is resistant to the chemicals in the furnace. The preferred material is mullite, a composition of aluminum silicate. Other materials which may be used to make the refractory are alumina and zirconia.

The inner firewall should be constructed of a material which has a relatively high heat conductivity and is resistant to the chemicals in the furnace. The preferred material is silicon carbide. Another choice is aluminum oxide. However, the heat conductivity of aluminum oxide is lower than silicon carbide and, therefore, the heat transfer surface area of the inner wall may need to be increased in order to obtain the desired heat recuperation. This can be done by any convenient means, such as by adding height to or by increasing the diameters of the furnace's outer and inner walls.

The following examples are given to further illustrate our invention. However, we do not wish to be limited by them, except as defined in the appended claims.

*Example 1*

A furnace was constructed in accordance with FIGURES 1 and 2 and having an inside volume of approximately 60 cubic feet. The furnace was preheated with a hydrogen-air flame at inlet 15 to a temperature of about 900 degrees centigrade. Residues from a process manufacturing hexachlorocyclopentadiene were then metered into the first inlet means 14 at a rate of about 425 pounds per hour. This feed comprised substantial quantities of the following materials: $CCl_4$, $C_2Cl_4$, $C_2Cl_6$, $C_4Cl_6$, $C_5Cl_6$, $C_5Cl_8$, and $C_6Cl_6$. The overall average feed composition of the materials was twenty percent carbon and eighty percent chlorine. In addition to the residue fed, there was also fed 100 pounds per hour of steam through the second inlet means 15. Air, at the rate of 660 pounds per hour was also introduced, some being fed in with the residue at inlet 14 to keep the inlet feed tube cool, and the balance being fed in at the bottom inlet 15. The furnace temperature at the top 12 was 930 degree centigrade. The exit gas comprised 350 pounds per hour hydrogen chloride, 311 pounds per hour carbon dioxide, 507 pounds per hour nitrogen, and the balance was excess steam and oxygen plus traces of carbon monoxide. The gases contained no detectable free chlorine ($Cl_2$), carbon, or organics.

*Example 2*

In the furnace and manner after Example 1 hexachlorocyclopentadiene residues were fed at a rate of 710 pounds per hour. Air and steam were fed as in Example 1. The amounts of air and steam were controlled so that no free carbon, chlorine ($Cl_2$) or organics were detectable in the exit gases. The furnace operated for a continuous period of 49 hours and the temperature varied at space 12 from 900 to 1110 degrees centigrade.

*Example 3*

In a furnace and manner after Example 1, hexachlorocyclopentadiene residues were fed in at a rate of 425 pounds per hour. The steam feed rate was varied from 40 to 82 pounds per hour with an air rate of 650 pounds per hour. The temperature at space 12 in the furnace varied from 955 degrees centrigrade to greater than 1300 degrees centigrade. There were no detectable carbon or organics in the exit gases. When the steam was fed at the lower rate of 40 pounds per hour, some free chlorine (Cl₂) appeared in the exit gases; however, at the higher steam feed rates, no free chlorine was detectable.

*Example 4*

In the furnace of FIGURES 1 and 2, a mixture of residues comprising about seventy-five percent benzoyl chloride residues (having an overall average composition of sixty-five percent carbon, four percent hydrogen, eleven percent oxygen and twenty-five percent chlorine) and about twenty-five percent hexachlorocyclopentadiene residues was easily disposed of using a feed rate of 175 pounds per hour of combined residue, 30 pounds per hour of steam, and 970 pounds per hour of air. The temperature at space 12 ranged from 990 to 1230 degrees centigrade. The exit gases contained no detectable free chlorine, carbon, or organics.

The hydrogen chloride produced by the furnace of this invention can be recovered as a saleable product, via any known means such as a hydrogen chloride absorption apparatus.

It is to be understood that in the specification and claims of this invention "halogenated" organic residues means those materials containing substituents of chlorine, bromine, and mixtures thereof. The furnace may also be used to dispose of fluorine and iodine containing organic residues, provided the furnace is constructed of materials which will withstand these materials and their products of combustion. It is also to be understood that although we have described our process and operation as being capable of burning halogenated residues, we do not wish to be limited thereto, for the process and apparatus can be used to burn other normally combustible organic materials as well.

We claim:

1. In apparatus for the conversion of halogenated organic compounds into normally gaseous products comprising carbon dioxide and hydrogen halide, said products having substantially no free chlorine, free carbon and organic compounds, a heat-recuperative furnace means comprising: an outer cylindrical firewall vertically positioned on a foundation at the bottom and covered at the top and having feed inlet means in the side thereof for introducing the said compounds, a hydrogen source to supply the hydrogen requirements and an oxygen source to supply the oxygen requirements; and an inner cylindrical heat conductive firewall concentrically aligned with the said outer firewall to form an annular space between the two said firewalls, and said inner firewall positioned on the said foundation and in direct communication with outlet means at the bottom, in open communication with the top inner space of the said outer firewall and adapted to exchange heat at the inner cylindrical surface through its wall to the outer annular space; whereby, while the furnace is being maintained at a temperature above that required to convert the said materials, the furnace internally preheats the feed materials and cools down the exiting reaction product gases.

2. In apparatus for the conversion of halogenated organic materials into normally gaseous products comprising carbon dioxide and hydrogen halide said products having substantially no free chlorine, free carbon and organic compounds; a heat-recuperative furnace means comprising: an outer cylindrical firewall vertically positioned on a foundation at the bottom and covered at the top and having feed inlet means in the side thereof for introducing the said materials with a hydrogen source to supply the hydrogen requirements selected from the group consisting of steam, hydrogen, hydrocarbon gas, and mixtures thereof, and with an oxygen source to supply the oxygen requirements selected from the group consisting of steam, air, oxygen, and mixtures thereof, said feed inlet means comprising a first feed inlet means positioned in the side of said outer firewall such that the feed materials are injected tangentially and downwardly so that the gases in the said annular space are in turbulence, and a second inlet means positioned in the side of the outer firewall near the said foundation for ejecting gases which are required for combustion therein to preheat the furnace and to regulate the composition of the combustion products; and an inner cylindrical heat conductive firewall concentrically aligned with the said outer firewall to form an annular space between the two said firewalls, and said inner firewall positioned on the said foundation and in direct communication with the top inner space of the said outer firewall and adapted to exchange heat at the inner cylindrical surface through its wall to the outer annular space; whereby, while the furnace is being maintained at a temperature above that required to convert the said materials, the furnace internally preheats the feed materials and cools down the exiting product reaction gases.

3. A furnace capable of converting halogenated organic chemicals into products comprising hydrogen halide and carbon dioxide which comprises: an outer cylindrical firewall vertically positioned on a foundation at the bottom and covered at the top; and an inner cylindrical heat conductive firewall concentrically aligned with the said outer firewall to form an annular space between the two said firewalls, and said inner firewall positioned on the said foundation and in direct communication with outlet means at the bottom and in open communication with the top inner space of the said outer firewall; first feed inlet means positioned in the side of said outer firewall such that when the feed materials are injected the gases in the said annular space are in turbulence; and second inlet means positioned in the side of the outer firewall near the said foundation for injecting gases which are required for combustion therein to preheat the furnace and regulate the composition of the combustion products.

4. A furnace capable of converting halogenated organic materials into products comprising hydrogen halide and carbon dioxide which comprises: an outer cylindrical firewall vertically positioned on a foundation at the bottom and covered at the top; and an inner cylindrical heat conductive firewall concentrically aligned with the said outer firewall to form an annular space between the two said firewalls, and said inner firewall positioned on the said foundation and in direct communication with outlet means at the bottom and in open communication with the top inner space of the said outer firewall; first feed inlet means positioned in the side of said outer firewall such that the feed materials are injected tangentially and downwardly so that the gases in the said annular spaces are in turbulence; and second inlet means for injecting gases which are required for combustion positioned in the side of the outer firewall near the said foundation therein to preheat the furnace and to regulate the composition of the combustion products.

References Cited in the file of this patent

UNITED STATES PATENTS

| | | |
|---|---|---|
| 1,099,451 | Meyer et al. | June 9, 1914 |
| 1,309,206 | Lasher | July 8, 1919 |
| 2,142,917 | Reich | Jan. 3, 1939 |
| 2,574,088 | Charlton | Nov. 6, 1951 |
| 2,576,228 | Kinnaird | Nov. 27, 1951 |
| 2,656,254 | Heller | Oct. 20, 1953 |
| 2,877,717 | Reed | Mar. 17, 1959 |

FOREIGN PATENTS

| | | |
|---|---|---|
| 640,444 | Great Britain | July 19, 1950 |